United States Patent [19]

Morita et al.

[11] Patent Number: 5,713,598
[45] Date of Patent: Feb. 3, 1998

[54] AIR BAG

[75] Inventors: Kazuo Morita; Motonobu Kitagawa, both of Shiga, Japan

[73] Assignee: Takata Corporation, Tokyo, Japan

[21] Appl. No.: 28,775

[22] Filed: Mar. 10, 1993

[30] Foreign Application Priority Data

Mar. 18, 1992 [JP] Japan ................................ 4-062182

[51] Int. Cl.[6] ........................................... B60R 21/16
[52] U.S. Cl. ........................... 280/743.1; 156/308.2; 280/728.1; 428/102
[58] Field of Search .................... 280/728 R, 743 R; 156/308.2; 428/36.1, 287, 102, 225

[56] References Cited

U.S. PATENT DOCUMENTS

| | | |
|---|---|---|
| 3,937,488 | 2/1976 | Wilson et al. |
| 4,144,115 | 3/1979 | Sundberg ............... 156/308.2 |
| 4,259,394 | 3/1981 | Khan . |
| 4,500,114 | 2/1985 | Grey, Jr. ................ 280/742 |
| 4,980,227 | 12/1990 | Sekiguchi et al. . |
| 5,071,161 | 12/1991 | Mahon et al. ............... 280/739 |
| 5,277,966 | 1/1994 | Nakayama et al. ........... 280/728 R |
| 5,302,432 | 4/1994 | Shigeta ..................... 280/728 R |

FOREIGN PATENT DOCUMENTS

| | | |
|---|---|---|
| 4009611 | 10/1991 | Germany ............... 280/728 R |
| 58-22360 | of 0000 | Japan . |
| 2250243 | 10/1987 | Japan ..................... 428/225 |
| 3112745 | 5/1991 | Japan ................... 280/743 R |
| 4-5144 | 1/1992 | Japan ................... 280/743 R |
| 4-92736 | 3/1992 | Japan ................... 280/728 R |
| 2091633 | 8/1982 | United Kingdom ......... 156/308.2 |
| 2249061 | 4/1992 | United Kingdom . |
| WO9015713 | 12/1990 | WIPO . |

*Primary Examiner*—Eric D. Culbreth
*Attorney, Agent, or Firm*—Kanesaka & Takeuchi

[57] ABSTRACT

An air bag has, at the rear end thereof, an opening for introducing an inflator or gas supplied from the inflator. At least a part of the air bag is made of an air permeable cloth. The air permeable cloth is constituted by a woven fabric. Warps and wefts of the woven fabric are bound with a resin.

11 Claims, 3 Drawing Sheets

AIR BAG

FIELD OF THE INVENTION

The present invention relates to an air bag of an air bag device retained in a vehicle for protecting an occupant when a vehicle collides. More particularly, it relates to an air bag having no vent holes.

DESCRIPTION OF THE RELATED ART

FIG. 3 is a perspective view showing an extended state of an air bag 1 for a driver's seat and FIG. 4 is a perspective view showing an expanded state of an air bag 2 for a passenger's seat.

These air bags comprise openings 3 and 4 where an inflator is inserted directly at the rear end portion thereof or where discharge gas from the inflator is introduced. In addition, vent holes 5 and 6 are formed at rear sides. When an occupant is forced into the extended air bag 1 or 2, the gas within the air bag flows out of the air bags through the vent hole 5 or 6 to absorb impact on the human body forced into the air bag.

By forming these vent holes, fine particles included in an exhaust gas from the inflator may sometimes flow out of the air bag. Thus, in the prior art, it has been proposed that the rear portion of the air bag is made of an air permeable cloth rather than using the vent hole.

In the Official Gazette of Japanese Utility Model Registration Unexamined Prepublication No. 22360/1983, an air bag is proposed that is constructed by a bag assembly which is made by integrally sewing an airtight bag portion and an air permeable portion made of cloth or the like. The air permeable portion has filtering function for filtering the above mentioned fine particles.

The air permeable portion is generally made of woven fabric. The woven fabric is coarsely textured with spaced warps and wefts. Thus, the warps and wefts slide and a partially coarse-textured portion or a close-textured portion may be generated. Accordingly, the air permeability is locally increased at the coarse-textured portion and the fine particles which should be filtered may pass therethrough. On the other hand, the air permeability is decreased at the close-textured portion and there is a problem that it is difficult to achieve designed air permeable amount.

OBJECT AND SUMMARY OF THE INVENTION

It is an object of the invention to provide an air bag comprising a rear portion which is made of cloth having uniform air permeable property in its entirety.

An air bag of a first aspect is at least partly made of an air permeable cloth. The air permeable cloth is constituted by a woven fabric. At least a part of warps and wefts of the woven fabric are bound with at least one of a resin and rubber.

An air bag of a second aspect resides in that, in the air bag of the first aspect, the bound portion of the fabric is formed as a lattice pattern.

An air bag of a third aspect resides in that, in the air bag of the second aspect, each lattice axis of the bound portion formed as the lattice i.e. an axis of an elongated portion for forming the lattice, and each thread axis of the woven fabric are crossed with each other at an inclined angle of 30–60°.

In the air bag of the first aspect, the resin bound portion where the warps and the wefts are bound with the resin is formed at a portion of the woven fabric. Thus, it is possible to prevent sliding of the warps and the wefts in a non-bound portion.

In the air bag of the second aspect, the resin bound portion is formed as the lattice. Thus, there is a large effect of preventing sliding of the warps and the wefts in the non-bound portion (coarse lattice portion).

In the air bag of the third aspect, each lattice axis of the resin bound portion and each thread axis of the woven fabric is crossed at an angle of 30–60°. Thus, there is a larger effect on preventing sliding of the warps and the wefts in the non-bound portion (coarse lattice portion).

PREFERRED EMBODIMENTS

An embodiment will be described below with reference to the drawings.

Figure 1:
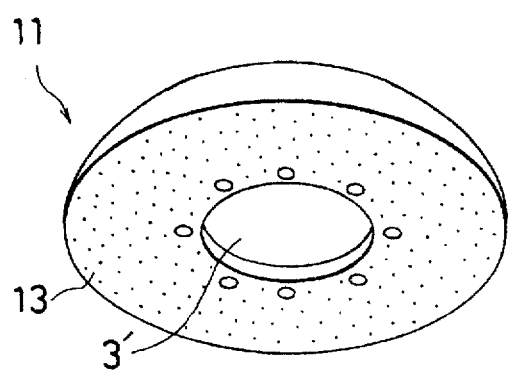
FIG. 1 is a perspective view of an air bag for a driver's seat according to an embodiment.
Figure 2:
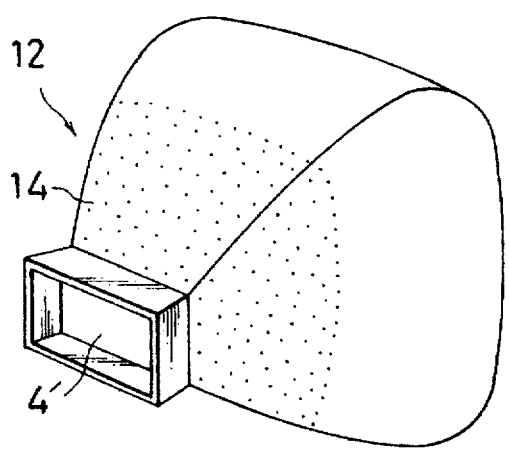
FIG. 2 is a perspective view of an air bag for a passenger's seat according to an embodiment.
Figure 3:
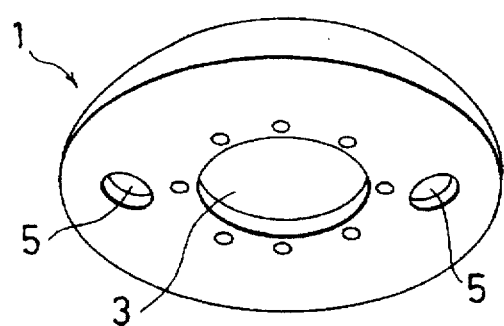
FIG. 3 is a perspective view of an air bag for a driver's seat according to a prior art.
Figure 4:
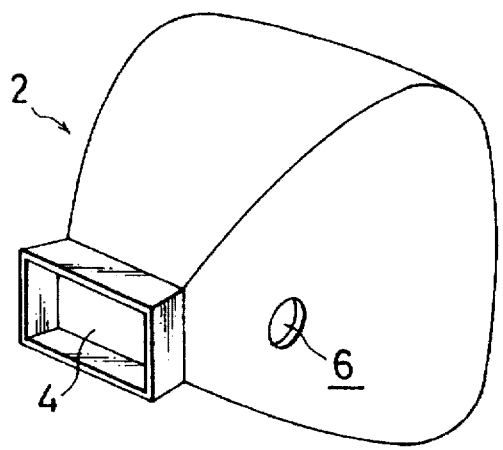
FIG. 4 is a perspective view of an air bag for a passenger's seat according to a prior art.

FIGS. 1 and 2 are perspective views showing extended states of air bags 11 and 12 according to an embodiment of the present invention. Rear portions 13 and 14 of the air bags are made of air permeable woven cloths.

Openings 3' and 4' have the same function as openings 3, 4 of the prior art.

For the air bag, a region made of the air permeable cloth lies at the rear portion of the air bag and it is preferable that the region is in the range of about 30–60%, and more preferably, 35–50% of the total surface area.

Preferably, quantity of airflow of the air permeable cloth ranges from 10 to 200 cc/cm$^2$/sec., and more preferably, from 20 to 60 cc/cm$^2$/sec.

For the warps and the wefts of the woven fabric, a synthetic fiber is suitable such as polyester and polyamide such as nylon (trade name) of 210–840 deniers.

The warps and the wefts are bound by at least one of a resin and rubber.

Methods for binding the warps and the wefts by using the resin are exemplified as the following (1) through (4).

Figure 5:
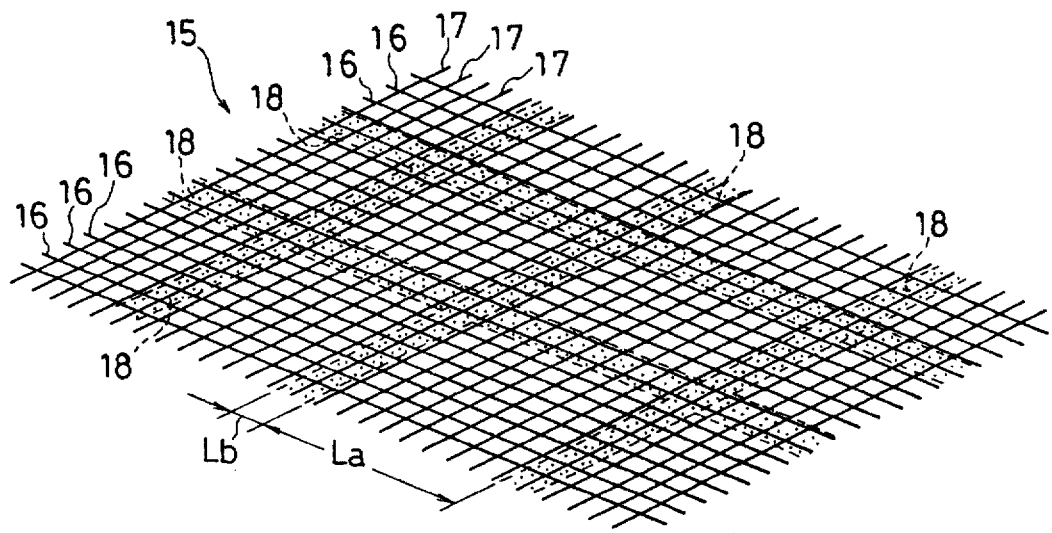
FIG. 5 is a perspective view for use in describing a cloth applied to an air bag according to an embodiment.

(1) As shown in FIG. 5, the resin coating is applied over a woven fabric 15 as a lattice pattern. A dotted region 18 in FIG. 5 is the region where the resin is coated. 16 represents warps and 17 represents wefts.

In this event, the coarse-textured size $L_a$ of the resin lattice pattern is preferably in the range of 0.5–50 mm, and more preferably, in the range of 1–30 mm. Further, a width of one lattice $L_b$ is preferably in the range of 0.5–50 mm, and more preferably, in the range of 1–30 mm.

The coarse-textured size of the lattice and the width of the lattice are properly determined depending on, for example, a shape of the air bag, sizes of the warp and the wefts, and the properties of the resin to be used.

This resin can be either the thermosetting or the thermoplastic one. The resin or rubber is preferably one selected from the group consisting of a silicone resin, a chloroprene rubber, a urethane rubber, butyl rubber, a copolymer thereof and a composition thereof.

Figure 6:
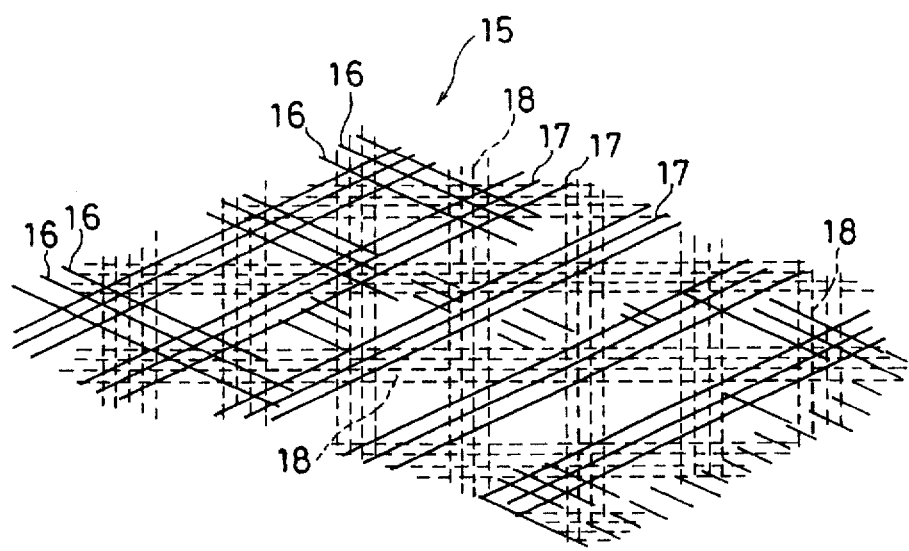
FIG. 6 is a perspective view for use in describing a cloth applied to an air bag according to an embodiment.

In FIG. 6, the resin coating is applied so that the lattice axis of the lattice and the thread axis of the woven fabric cross at an angle of 45°.

(2) The woven fabric is impregnated with a liquid resin to make the resin adhere to the warps and the wefts by means of drawing up, coating or lamination. Subsequently, the resin is cured to bind the warps and wefts at substantially every crossing thereof.

A vent which penetrates the resin from the outer surface to the inner surface is formed so as to provide air permeability.

The resin or rubber is preferably selected from the group consisting of the silicone resin, the urethane resin, the butyl rubber, and the copolymer thereof and the composition thereof.

Preferably, the adhesion amount for every 1 m² cloth ranges from 1 to 100 g and more preferably, ranges of 5 to 60 g.

A coated film having the above mentioned air permeability exhibits the property of allowing the gas ingredient in the gas supplied from the inflator to pass therethrough while resisting the passage of any particulate matter in the gas in the inflator.

(3) The warps and the wefts are either previously impregnated with the thermoplastic resin or surface-coated. After making a cloth using these warps and wefts, it is heated to melt and bind the warps and weafts with this resin.

For this resin, the thermoplastic resin is preferable such as polyethylene, polystyrene and polyamide. In case where the threads are impregnated with the resin, the loading amount is preferably in the range of about 1~100 g for every 1 m² cloth. In case where the resin is coated on the surface of the thread, the amount is preferably in the range of about 1~70 g for every 1 m² cloth.

(4) A double-structured thread is used for at least one of the warps and the wefts.

After making the cloth by using the double-structured thread, it is heated for welding.

Figure 7:
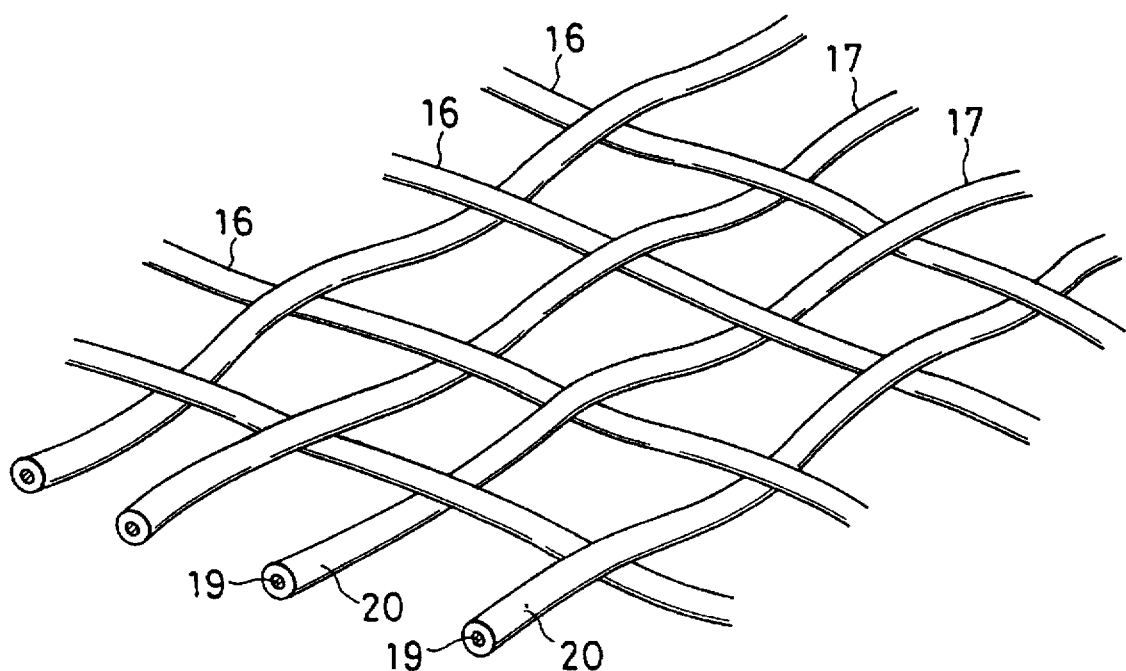
FIG. 7 is a perspective view for use in describing a cloth applied to an air bag according to an embodiment.

In the double-structured thread, as shown in FIG. 7, a core 19 is made of a high-melting material and a periphery 20 is constituent by a low-melting material. For the material of core 19, polyamide such as nylon(trade name) is preferable. For the material of Periphery 20, polyethylene, polystyrene are preferable.

After making the cloth, it is heated at a temperature lower than or equal to the melting point of the core and higher than or equal to the melting point of the periphery to weld the warps and the wefts.

As mentioned above, by means of binding the warps and the weafts with the resin, it is possible to prevent the warps and the wefts from sliding or slipping and the entire cloth is subjected to uniform air permeable property. Thus, the air permeable property at the rear portion becomes uniform. In addition, the particles in the discharge gas from the inflator can be positively filtered. Further, the cutting and sewing operation can be readily made.

According to the present invention, it is possible to adjust air permeability of the cloth by means of increasing and decreasing the amount of the resin to be adhered to the air permeable cloth.

What is claimed is:

1. An air bag at least a part of which is made of an air permeable cloth, wherein said air permeable cloth is constituted by a woven fabric with a thread axis, and at least a part of warps and wefts of said woven fabric is bound with a bonding material of at least one of a resin and rubber coated onto the fabric having the warps and wefts in a form of a lattice with a lattice axis so that said warps and wefts are prevented from sliding and slipping by the bonding material in the form of the lattice, said lattice axis and thread axis crossing with each other at an inclined angle of 30–60°.

2. An air bag as claimed in claim 1, wherein a region made of the air permeable woven cloths lies at a rear portion of said air bag, and the region is in the range of about 30–60% of the total surface area of said air bag.

3. An air bag as claimed in claim 1, wherein the quantity of airflow of the air permeable cloth ranges from 10 to 200 cc/cm²/sec.

4. An air bag as claimed in claim 1, wherein the material for the warps and the wefts of said woven fabric is at least one of polyamide and polyester of 210~840 deniers.

5. An air bag as claimed in claim 1, wherein a coarse-textured size of said lattice is in the range of 0.5~50 mm.

6. An air bag as claimed in claim 1, wherein the width of one lattice is in the range of 0.5~50 mm.

7. An air bag as claimed in claim 1, wherein the bonding material is selected from the group consisting of a silicone resin, a chloroprene rubber, urethane rubber, butyl rubber, a copolymer of at least two thereof and a composition of at least two thereof.

8. An air bag comprising:
a front portion of the air bag, and
a rear portion of the air bag, said rear portion being made of an air permeable woven cloth formed of warps and wefts, and including a bonding material made of at least one of a resin and rubber, said bonding material being coated onto the air permeable woven cloth formed of the warps and wefts in a lattice pattern to have uncoated warp and weft portions inside the lattice pattern without completely covering the warps and wefts of the woven cloth by the bonding material to thereby bond the warps and wefts by the bonding material in the lattice pattern so that the warps and wefts are prevented from sliding and slipping to thereby provide uniform air permeable property at the rear portion.

9. An air bag according to claim 8, wherein said lattice pattern includes a coarse-textured size in the range of 0.5–50 mm, and the width of one lattice in the range of 0.5–50 mm.

10. An air bag according to claim 9, wherein said lattice pattern is inclined relative to the warps and wefts of the woven cloth.

11. An air bag comprising:
a front portion of the air bag, and
a rear portion of the air bag, said rear portion being made of an air permeable woven cloth formed of warps and wefts, and including a bonding material made of at least one of a resin and rubber, said bonding material being coated onto the air permeable woven cloth in a lattice pattern to have uncoated warp and weft portions inside the lattice pattern without completely covering the warps and wefts of the woven cloth by the bonding material to thereby bond the warps and wefts by the bonding material in the lattice pattern so that the warps and wefts are prevented from sliding and slipping to thereby provide uniform air permeable property at the rear portion, said lattice pattern being formed of lateral sections parallel to and spaced apart from each other and vertical sections parallel to and spaced apart from each other, said lateral and vertical sections crossing each other, each of said lateral and vertical sections being formed of a plurality of coating lines slightly spaced apart from each other.

* * * * *